United States Patent [19]

Haynes et al.

[11] Patent Number: 4,793,377

[45] Date of Patent: Dec. 27, 1988

[54] DIRECT DRIVE SERVO VALVE

[75] Inventors: Larry E. Haynes, Syracuse; Larry L. Lucas, Midvale, both of Utah

[73] Assignee: E-Systems, Inc., Dallas, Tex.

[21] Appl. No.: 89,033

[22] Filed: Aug. 24, 1987

Related U.S. Application Data

[63] Continuation of Ser. No. 898,143, Aug. 18, 1986, abandoned.

[51] Int. Cl.[4] .................... F15B 13/044; F16K 31/04

[52] U.S. Cl. ............................ 137/625.65; 137/331; 251/129.11

[58] Field of Search ........................ 137/331, 625.65; 251/129.11, 129.12, 129.13

[56] References Cited

U.S. PATENT DOCUMENTS

| | | | |
|---|---|---|---|
| 3,040,768 | 6/1962 | Pippenger | 137/625.64 X |
| 3,556,143 | 1/1971 | Nally | 251/260 X |
| 3,643,699 | 2/1972 | Mason | 137/625.65 X |
| 4,114,465 | 9/1978 | Troy | 251/129.11 X |
| 4,133,511 | 1/1979 | Hartmann et al. | 137/625.65 X |
| 4,190,081 | 2/1980 | Coles | 137/625.65 X |
| 4,339,737 | 7/1982 | Meyers et al. | 251/129.11 X |
| 4,507,634 | 3/1985 | Vanderlaan | 335/272 |
| 4,534,273 | 8/1985 | Vanderlaan | 251/129.13 X |
| 4,573,494 | 3/1986 | Spurbeck | 137/331 |
| 4,641,812 | 2/1987 | Vanderlaan et al. | 251/129.11 X |
| 4,645,178 | 2/1987 | Martin et al. | 137/625.65 X |
| 4,672,992 | 6/1987 | Vanderlaan et al. | 251/129.11 X |

FOREIGN PATENT DOCUMENTS

| | | | |
|---|---|---|---|
| 196517 | 6/1965 | Sweden | 137/625.65 |
| 2133583 | 7/1984 | United Kingdom | 137/625.64 |

*Primary Examiner*—Gerald A. Michalsky

*Attorney, Agent, or Firm*—Albert M. Crowder, Jr.

[57] ABSTRACT

A direct drive servo valve includes a valve housing having a cylindrical bore and a valve spool mounted for movement in the bore for controlling fluid flow through said valve housing. The valve spool has a drive well located in the spool transverse of its longitudinal axis. A motor secured to the valve housing includes a rotor which is rotated in response to a drive signal applied to stator windings of the motor. A shaft attached to the rotor for rotation therewith includes a substantially spherical drive tip, the spherical tip positioned eccentrically to the longitudinal axis of the shaft and being close fitted into the drive well. In operation, as the shaft rotates through a given angular rotation, the spherical tip rotates in a circular path to provide linear displacement and rotational motion to the valve spool.

5 Claims, 2 Drawing Sheets

DIRECT DRIVE SERVO VALVE

This application is a continuation of application Ser. No. 898,143, filed Aug. 18, 1986, now abandoned.

TECHNICAL FIELD

This invention relates to direct drive servo valve and more particularly to a servo valve where rotational motion of a power source is converted into linear motion and rotational displacement of the valve spool.

BACKGROUND OF THE INVENTION

Torque motor operated spool valves are well-known in the art as evidenced by the number of patents issued by the United States Patent and Trademark Office related to such valves. A typical torque motor driven spool valve includes a movable member disposed within a bore having an inlet port and an outlet port to provide communication between a supply passage and a load passage in a controlled fashion in response to an application of an electrical signal to an electrically driven torque motor. This electrically driven torque motor is operatively interconnected with the valve member. Typical of United States patents issued on inventions relating to spool valves is U.S. Pat. No. 3,040,768, entitled "OSCILLATING VALVE".

As disclosed in U.S. Pat. No. 3,040,768, an electric motor is secured to the valve housing and drives a shaft that includes an eccentric pin fitted into an annular groove. This mechanism and the operation thereof imparts an oscillatory motion to a ported sleeve to prevent sticking or binding of the spool. To prevent this sticking or binding the eccentric pin is continuously rotated to impart a high frequency, low amplitude "dither" to the ported sleeve. Metering or control of flow through the valve is achieved by independently actuated drive solenoids operatively engaging the ported sleeve.

SUMMARY OF THE INVENTION

In accordance with the present invention there is provided a direct drive servo valve that includes a valve housing having a cylindrical bore within which a valve spool is mounted for slidable motion. Movement of the valve spool within the cylindrical bore controls fluid flow through the valve housing. Formed within the valve spool transverse to a longitudinal axis of the spool is a drive well. Further, the servo valve of the present invention includes a servo motor secured to the valve housing and having a limited angularly rotational rotor positioned in response to an electrical drive signal applied to the motor. Extending from and as an integral part of the rotor is a shaft having a substantially spherical tip portion that is eccentrically positioned with respect to a longitudinal axis of the shaft. This substantially spherical tip engages the drive well of the spool in a close fit engagement such that rotation of the rotor and in turn the shaft imparts rotational motion to the spherical tip to provide a linear displacement and a rotational motion of the valve spool in the cylindrical bore.

Further, in accordance with the present invention there is provided a direct drive servo valve wherein the amount of eccentricity of the substantially spherical tip determines the stroke and the rotational angular motion of the valve spool in response to an applied drive signal.

In the utilization of servo valves, there are applications that require either open loop valves or closed loop valves. In accordance with the present invention the direct drive servo valve is provided with a linear variable displacement transducer (LVDT) responsive to the valve spool movement to provide position feedback or failure detection.

BRIEF DESCRIPTION OF THE DRAWINGS

For a more complete understanding of the present invention and the advantages thereof, reference is now made to the following description taken in conjunction with the accompanying drawings.

Referring to the drawings.

DETAILED DESCRIPTION

Figure 1:
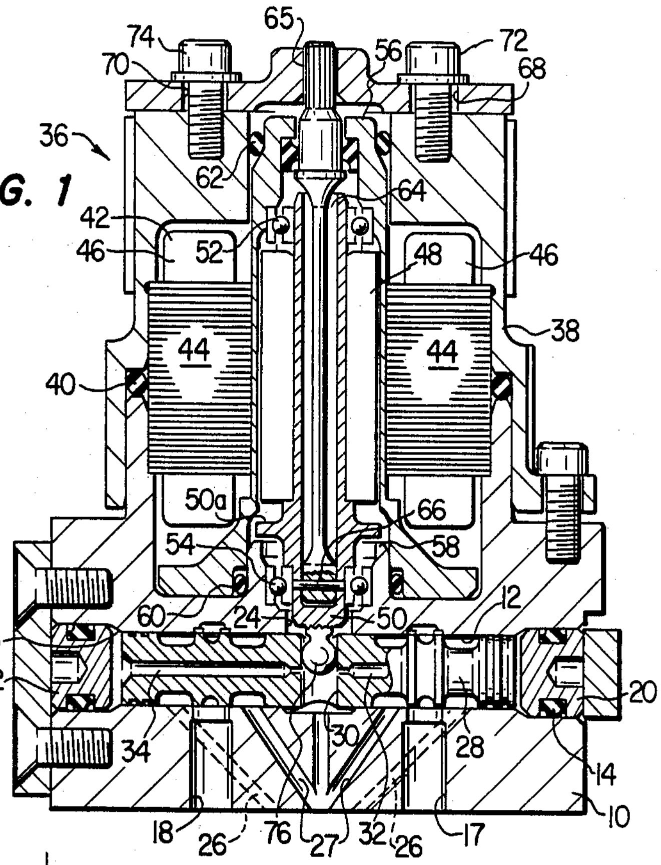
FIG. 1 is a cross-sectional view of a direct drive servo valve of an open loop configuration in accordance with the present invention.

Referring to FIG. 1, there is shown a direct drive servo valve including a housing 10 having a longtudinal bore 12 terminating at either end with counterbores 14 and 16. Opening within the bore 12 are passageways 17 and 18 for control signals to the valve. Also included in the housing 10 are supply ports 26 and return ports 27 positioned within the counterbores 14 and 16 are bushings 20 and 22, respectively, for forming a chamber within the housing 10 at the bore 12. About midway between the bushings 20 and 22 there is formed in the housing 10 an aperture 24 extending perpendicular to the bore 12.

The valve of FIG. 1 may be connected in various configurations in a system for fluid control by means of supply ports 26 within the housing 10. When the servo valve of FIG. 1 is used in a closed loop configuration, one end of the housing 10 is typically fitted with a linear variable displacement transducer (LVDT).

Slidably positioned within the bore 12 is a spool 28 having displaced along its longitudinal axis various lands for control of fluid through the housing 10. The specific configuration of the spool 28 will vary with the application of the valve and the configuration shown in FIG. 1 is merely by way of illustration. Transverse of the longitudinal axis of the spool 28 is a drive well 30 located to be in alignment with the aperture 24. Opening into the drive well 30 are longitudinal passages 32 and 34 that terminate at the opposite faces of the spool 28. These passages are vented to a return port to insure a pressure balance across the valve spool.

Mounted to the housing 10 is a drive assembly 36 including a valve cover 38 bolted or otherwise fastened to the housing 10. The valve cover 38 is in an environmental sealing engagement with the housing 10 by means of an O-ring seal 40. Ridgedly secured to the housing 10 within the valve cover 38 is a drive motor including a stator 42 consisting of magnetic pole pieces 44 and drive windings 46. These drive windings are connected to receive an electrical drive signal from an external source (not shown). It is this electrical drive signal that controls the positioning of the spool 28 as will be described.

Also forming a part of the drive motor is a rotor 48 mounted within the stator pieces 44 by means of a rotatably mounted shaft 50. The shaft 50 is rotatably mounted by means of bearings 52 and 54 with the bearing 52 press fit into a barrier tube 56 and the bearing 54 press fit into a housing extension 58. Press fit onto the housing extension 58 is the barrier tube 56. An O-ring seal 60 provides a fluid tight connection between the housing extension 58 and the barrier tube 56. A further O-ring 62 also insures an environmental seal between the valve cover 38 and the barrier tube.

To limit rotational movement of the shaft 50 a torsion spring 64 is fastened to one end of the shaft by means of a pin 66 and at the opposite end to a null adjacent cap 65 in a non-rotational configuration. Typically, the end of the spring 64 engaging the cap 65 has a splined outer surface that is press fit into the cap. The null adjustment cap 65 is provided with adjustment slots 68 and 70 through which mounting bolts 72 and 74 are inserted to engage with the valve cover 38. By positioning the null adjustment cap 65 the torsional force exerted by the spring 64 is adjusted to provide a null position for the shaft 60 which is also provided with rotational stops **50*a***.

Integrally attached to the free end of the shaft 50 at pin 66 is an eccentrically mounted substantially spherical drive tip 76. This drive tip is dimensioned to have a near zero backlash when inserted into the drive well 30. Typically, the tolerance between the drive tip 76 and the drive well 30 provides a match fit with a 40 to $50\times10^{-6}$ clearance. This allows a "wetting" action between the surfaces of the drive tip and the drive well thereby minimizing frictional interferences between the mating surfaces. Also, the drive tip 76 is provided with flats on opposite sides to minimize the "dashpot" effect and allow oil circulation to carry off particles that cause wear.

Figure 2:
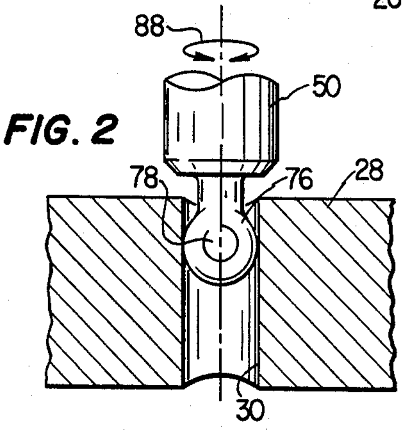
FIG. 2 is a cross-sectional view of the valve spool, partially cut-away, showing the close fit engagement between a substantially spherical tip of a drive shaft into a drive well.
Figure 3:
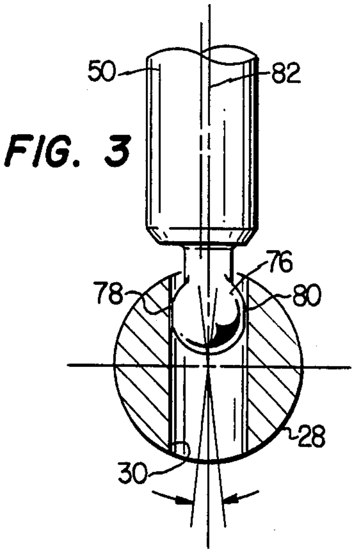
FIG. 3 is a sectional view through the valve spool at the drive well showing the eccentricity of the substantially spherical ball of the drive shaft.
Figure 4:
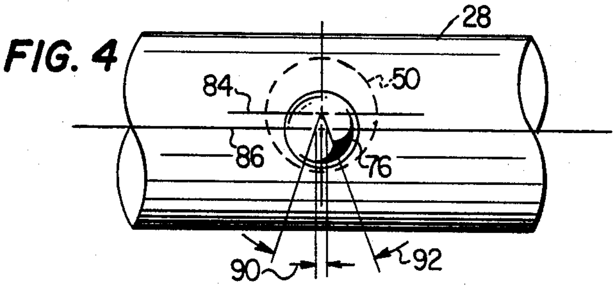
FIG. 4 is a top view of the valve spool, partially cut away, showing the close fit engagement between the substantially spherical ball of the drive shaft and the the drive well illustrating the eccentricity of the drive ball and the angular rotation thereof.

Referring to FIGS. 2 through 4, there is illustrated in detail the configuration of the drive tip 76 as it engages the drive well 30. As best illustrated in FIGS. 2 and 3, the drive tip 76 is provided with flats 78 and 80 on opposite faces of the otherwise substantially spherical shaped drive tip. These flats provide a fluid path around the drive tip to insure the wetting action as described previously. As most clearly illustrated in FIGS. 3 and 4, the substantially spherical tip 76 has a vertical axis 82 offset from the longitudinal axis of the shaft 50. The amount of this offset is shown in FIG. 4 between the two axis lines 84 and 86.

With reference to FIGS. 1 through 4, in operation of the drive assembly 36, energization of the stator windings 46 imparts a rotational force to the shaft 50 which is transmitted to the drive tip 76. The shaft 50 has an angular rotation as illustrated by the arrow 88 of FIG. 2 that imparts a circular path motion into the drive tip 76. With the drive tip 76 close fitted into the drive well 30, movement of the tip along the circular path of arrow 88 imparts both a linear displacement and rotational motion to the valve spool 28. Typically, the total slide displacement of the spool is shown by the reference number 90 between the two reference lines. This displacement results from an angular rotation of the shaft 50 along a circular path as illustrated by the reference number 92 of FIG. 4. This angular motion and in turn the linear displacement of the spool 28 is determined by the eccentricity of the substantially spherical drive tip 76 with reference to the shaft 50.

Figure 5:
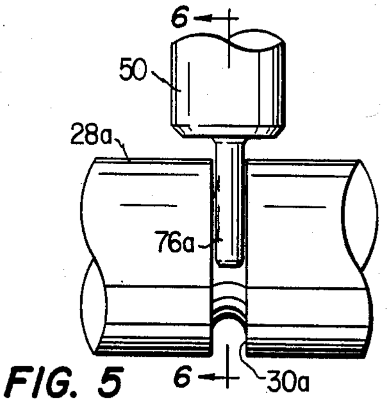
FIG. 5 is a cross-sectional view of an alternate embodiment of the valve spool, partially cut away, showing an annular drive well and a cylindrical shaped drive tip.
Figure 6:
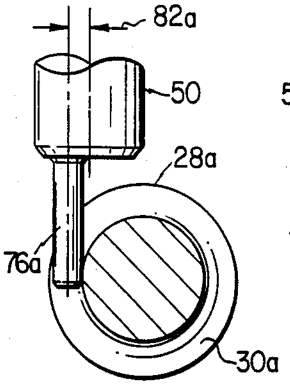
FIG. 6 is a sectional view through the valve spool of FIG. 5 taken along the line 6—6 showing the eccentricity of the drive tip with reference to the centerline of a drive shaft.

Referring to FIGS. 5 and 6, there is illustrated in detail an alternate configuration of the drive tip and spool for movement thereof in response to rotation of the shaft 50. The spool **28*a* includes an annular groove 30*a* that replaces the drive well 30 of FIGS. 2 through 4. Extending from the shaft 50 is a drive tip 76*a* dimensioned to have a near zero backlash when positioned in the drive well 30*a*. As most clearly illustrated in FIG. 6, the drive tip 76*a* has a vertical axis 82*a* offset from the longitudinal axis of the shaft 50. The amount of this offset is shown in FIG. 6** as a "centerline offset."

In operation of the alternate drive tip embodiment of FIGS. 5 and 6, rotation of the shaft 50 imparts a circular path motion to the drive tip **76*a* which in turn imparts linear displacement to the valve spool 28*a***.

Figure 7:
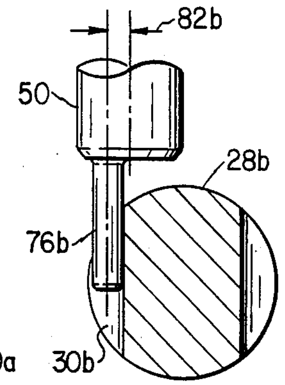
FIG. 7 is a sectional view through the valve spool at the drive well showing another alternate embodiment of the valve spool.

Referring to FIG. 7, there is shown a second alternate embodiment for positioning of the spool **28*b* by rotation of the drive shaft 50. The spool 28*b* includes a vertically positioned drive well 30*b* into which is fitted a drive pin 76*b*. Again, this drive tip 76*b* has a vertical axis 82*b* offset from the longitudinal axis of the shaft 50. In the embodiment of FIG. 7, angular rotation of the shaft 50 imparts only linear motion to the spool 50**.

Figure 8:
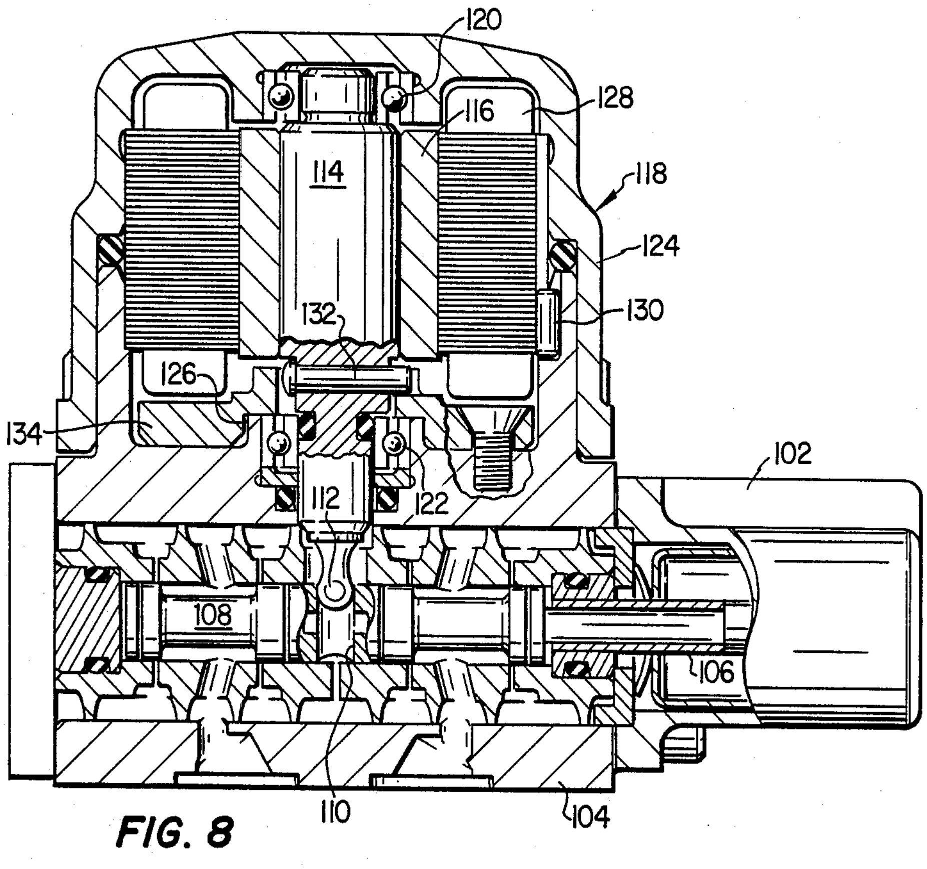
FIG. 8 is a cross-sectional view of an alternate embodiment of the present invention in a closed loop configuration.

Referring to FIG. 8, there is shown an alternate embodiment of a direct drive servo valve that includes a linear variable displacement transducer (LVDT) 102 mounted to a housing 104 and including a plunger 106 coupled to a valve spool 108. While the housing 104 and the spool 108 of FIG. 8 have a different design configuration from that illustrated in FIG. 1, the porting and land arrangement are conventional and will not be further described.

With reference to FIG. 8, the valve spool 108 includes a drive well 110 into which is fitted a substantially spherical drive tip 112 having a configuration as illustrated and described with reference to FIGS. 2 through 7. This drive tip is eccentrically mounted to a shaft 114 as part of a rotor 116. The shaft 114 and rotor 116 are part of a drive assembly 118 similar in construction to the drive assembly 36 of FIG. 1. However, with reference to FIG. 8, the shaft 114 is of a solid construction and rotatably mounted by means of bearings 120 and 122. The bearing 120 is press fit into a valve cover 124 and the bearing 122 is press fit into a housing extension 126.

Included as part of the drive assembly 118 is a stator 128 that is pinned against rotation to the housing 104 by means of a locating pin 130.

In the embodiment of FIG. 8 angular rotation of the shaft 114 is limited by means of a pin 132 extending through an opening in the shaft and in engagement with stop surfaces of a lower bearing retainer plate 134.

Operationally, the embodiment of the invention of FIG. 8 is similar to that of FIG. 1. Energization of the windings of the stator 128 imparts a rotational motion to the shaft 114 which produces a circular path motion for the drive tip 112. This motion of the drive tip 112 imparts a linear motion and angular displacement to the valve spool 108. With the embodiment of FIG. 8, displacement of the spool 108 also produces a displacement of the plunger 106 to produce a variable voltage from the transducer 102 in accordance with conventional operation of such transducers.

Although the invention has been described and illustrated in detail, it is to be understood that the same is by way of illustration and example only and is not to be taken by way of limitation. The spirit and scope of this invention is given by the terms of the appended claims.

We claim:

1. A direct drive servo valve comprising:

a valve housing having a cylindrical bore;

a valve spool mounted for movement in the cylindrical bore of said valve housing for controlling fluid through said valve housing between at least one supply port and at least one return port, said valve spool having a cylindrical drive well extending through the spool and located therein with a longitudinal axis transverse to the longitudinal axis of the spool;

drive means secured to the valve housing and having a stator and a hollow rotor, said rotor being rotated in response to energy applied to the stator of the drive means;

a hollow shaft mounted inside of said hollow rotor for rotation therewith;

torque adjustment means mounted inside said shaft and fastened at one end to said shaft to control rotational movement thereof;

null adjustment means engaging the other end of said torque adjustment means and said drive means to adjust the null position of said shaft; and a spherical tip formed integral with said shaft at one end thereof to be located above the longitudinal axis of the spool and eccentric to the longitudinal axis of said shaft and having a close fit in said drive well such that rotation of the shaft imparts motion to the spherical tip to provide a linear displacement of the valve spool in said valve housing.

2. The direct drive servo valve as described in claim 1 wherein said valve spool includes a central aperture along its longitudinal axis vented to a return port to minimize unbalance in the servo valve.

3. The direct drive servo valve as described in claim 1 wherein said spherical tip is provided with flat surfaces on opposite sides thereof to minimize the dashpot effect and allow oil circulation past said tip.

4. A direct drive servo valve comprising:

a valve housing having a cylindrical bore;

a valve spool mounted for movement in the cylindrical bore of said valve housing for controlling fluid flow through said valve housing;

a cylindrical drive well extending through said valve spool and located therein with a longitudinal axis transverse to the longitudinal axis of the spool;

drive means secured to the valve housing and having a stator and a rotor, said rotor being rotated in response to energy applied to the stator of the drive means;

a shaft attached to said rotor for rotation therewith;

torque adjustment means mounted to said shaft and having one of two ends fastened to one end of said shaft to control rotational movement;

null adjustment means mounted external of said drive means and engaging the second end of said torque adjustment means to adjust the null position of said shaft, said drive means, said shaft, and said torque adjustment means assembled to said valve housing; and a spherical tip formed integral with such shaft at one end thereof to be located above the longitudinal axis of the spool and eccentric to the longitudinal axis of said shaft.

5. The direct drive servo valve as in claim 4 further including flat surfaces on said spherical tip on opposite sides thereof to minimize the dashpot effect and insure a wetting action between the spherical surface of the drive tip and the drive well to minimize frictional interference.

* * * * *